(12) United States Patent
Henderson et al.

(10) Patent No.: US 10,251,103 B2
(45) Date of Patent: *Apr. 2, 2019

(54) ADAPTIVE RATE OF CONGESTION INDICATOR TO ENHANCE INTELLIGENT TRAFFIC STEERING

(71) Applicant: AT&T Mobility II LLC, Atlanta, GA (US)

(72) Inventors: Thomas W. Henderson, Alpharetta, GA (US); Hongyan Lei, Plano, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,834

(22) Filed: Dec. 6, 2017

(65) Prior Publication Data
US 2018/0109981 A1 Apr. 19, 2018

Related U.S. Application Data

(63) Continuation of application No. 14/055,067, filed on Oct. 16, 2013, now Pat. No. 9,872,210.

(51) Int. Cl.
*H04W 28/08* (2009.01)
*H04W 36/00* (2009.01)
*H04W 36/22* (2009.01)

(52) U.S. Cl.
CPC ....... *H04W 36/0083* (2013.01); *H04W 28/08* (2013.01); *H04W 36/22* (2013.01)

(58) Field of Classification Search
CPC .......................... H04W 36/0083; H04W 28/08
USPC ........................................................ 370/232
See application file for complete search history.

(56) References Cited

U.S. PATENT DOCUMENTS

| | | | |
|---|---|---|---|
| 6,775,541 B2 | 8/2004 | Dillon et al. | |
| 6,799,045 B1 | 9/2004 | Brouwer | |
| 6,889,050 B1 | 5/2005 | Willars et al. | |
| 6,985,739 B2 | 1/2006 | Spaling et al. | |
| 7,251,491 B2 | 7/2007 | Jha | |
| 7,831,256 B2 | 11/2010 | Morita | |
| 7,864,727 B2 | 1/2011 | Inayoshi et al. | |
| 7,961,616 B2 | 6/2011 | Jain et al. | |
| 8,107,369 B2 | 1/2012 | Sagfors | |

(Continued)

OTHER PUBLICATIONS

Acampora, et al., "An architecture and methodology for mobile-executed handoff in cellular ATM networks," IEEE Journal on Selected Areas in Communications, Oct. 1994, vol. 12, No. 8, pp. 1365-1375.

(Continued)

*Primary Examiner* — Mark H Rinehart
*Assistant Examiner* — Peter G Solinsky
(74) *Attorney, Agent, or Firm* — Amin, Turocy & Watson, LLP

(57) ABSTRACT

Traffic associated with user equipment that are served by a first radio access network is steered to a second radio access network based on a rate of congestion criterion. Network load is monitored by an access point to determine rate of congestion data associated with the access point. As an example, the rate of congestion represents a change in network load of the access point over a defined time period. The rate of congestion data is then transmitted to one or more neighboring access points that can utilize the rate of congestion data to facilitate traffic steering, load balancing, and/or neighbor relationship management.

20 Claims, 14 Drawing Sheets

(56) References Cited

U.S. PATENT DOCUMENTS

| | | |
|---|---|---|
| 8,422,373 B2 | 4/2013 | Alanara |
| 8,456,989 B1 | 6/2013 | Sigg et al. |
| 8,797,877 B1 | 8/2014 | Perla et al. |
| 2004/0136379 A1 | 7/2004 | Lia et al. |
| 2006/0233110 A1 | 10/2006 | Yang et al. |
| 2007/0081462 A1 | 4/2007 | Gefflaut et al. |
| 2008/0002670 A1 | 1/2008 | Bugenhagen et al. |
| 2008/0002676 A1 | 1/2008 | Wiley et al. |
| 2008/0049746 A1 | 2/2008 | Morrill et al. |
| 2008/0052387 A1 | 2/2008 | Heinz et al. |
| 2009/0005049 A1 | 1/2009 | Nishio et al. |
| 2011/0019549 A1 | 1/2011 | Strulo et al. |
| 2011/0158099 A1 | 6/2011 | Fujita |
| 2011/0170408 A1 | 7/2011 | Furbeck |
| 2011/0261695 A1 | 10/2011 | Zhao et al. |
| 2012/0106346 A1 | 5/2012 | Aguirre et al. |
| 2012/0182859 A1 | 7/2012 | Ikeda et al. |
| 2012/0270553 A1 | 10/2012 | Ha |
| 2013/0070594 A1 | 3/2013 | Garcia Martin et al. |
| 2013/0143579 A1 | 6/2013 | Kwan |
| 2013/0242726 A1 | 9/2013 | Zhu et al. |
| 2014/0004862 A1 | 1/2014 | Ekemark |
| 2014/0119184 A1 | 5/2014 | Harrang et al. |
| 2014/0133296 A1 | 5/2014 | Johannson |
| 2014/0148175 A1 | 5/2014 | Luo et al. |
| 2014/0282747 A1 | 9/2014 | Richman |
| 2014/0329485 A1 | 11/2014 | Calin et al. |
| 2014/0334302 A1 | 11/2014 | Loach |
| 2014/0355443 A1 | 12/2014 | Smith |
| 2015/0016412 A1 | 1/2015 | Horn et al. |
| 2015/0071071 A1 | 3/2015 | Hughes |
| 2015/0117230 A1 | 4/2015 | Cui |
| 2015/0304889 A1 | 10/2015 | Qian |
| 2016/0036706 A1 | 2/2016 | Hiscock |
| 2016/0205570 A1 | 7/2016 | Bedekar |

OTHER PUBLICATIONS

Naghshineh, et al, "Distributed call admission control in mobile/wireless networks," IEEE Journal on Selected Areas in Communications, May 1996, vol. 14, No. 4, pp. 711-717.

Nanda, "Teletraffic models for urban and suburban microcells: cell sizes and handoff rates," IEEE Transactions on Vehicular Technology, 1993, vol. 42, No. 4, pp. 673-682.

Office Action dated Mar. 11, 2015 for U.S. Appl. No. 14/055,067, 26 pages.

Final Office Action dated Aug. 18, 2015 for U.S. Appl. No. 14/055,067, 22 pages.

Office Action dated Jan. 28, 2016 for U.S. Appl. No. 14/055,067, 22 pages.

Final Office Action dated Jun. 21, 2016 for U.S. Appl. No. 14/055,067, 17 pages.

Office Action dated Oct. 4, 2016 for U.S. Appl. No. 14/055,067, 23 pages.

Final Office Action dated Apr. 27, 2017 for U.S. Appl. No. 14/055,067, 23 pages.

ADAPTIVE RATE OF CONGESTION INDICATOR TO ENHANCE INTELLIGENT TRAFFIC STEERING

RELATED APPLICATION

The subject application is a continuation of, and claims priority to, U.S. patent application Ser. No. 14/055,067 (now U.S. Pat. No. 9,872,210), filed Oct. 16, 2013, and entitled "ADAPTIVE RATE OF CONGESTION INDICATOR TO ENHANCE INTELLIGENT TRAFFIC STEERING." The entirety of the foregoing listed application is hereby incorporated by reference herein.

TECHNICAL FIELD

The subject disclosure relates to wireless communications, e.g., to an adaptive rate of congestion indicator that enhances intelligent traffic steering.

BACKGROUND

With an explosive growth in utilization of communication devices, mobile telecommunications carriers are seeing an exponential increase in network traffic. To meet the demands of higher traffic, conventional systems employ traffic steering mechanisms that offload mobile traffic from a first cell to an overlapping second cell. For example, if the first cell is determined to be congested, one or more data flows of a user equipment coupled to a first access point of the first cell can be steered to a second access point of the second cell. As more traffic is steered to the second cell, the load of the second cell increases and is driven closer to maximum load level (e.g., congested state). In a complex communication networks, for example, with multiple layers (e.g., macro cells, pico cells, femtocells, etc.) and/or multiple technologies (e.g., LTE, UMTS, Wi-Fi, etc.), network conditions (e.g., traffic, capacity) vary throughout the day and steering traffic to a congested target cell can result in a ping-pong effect wherein the traffic is oscillated between cells.

DETAILED DESCRIPTION

Figure 1:
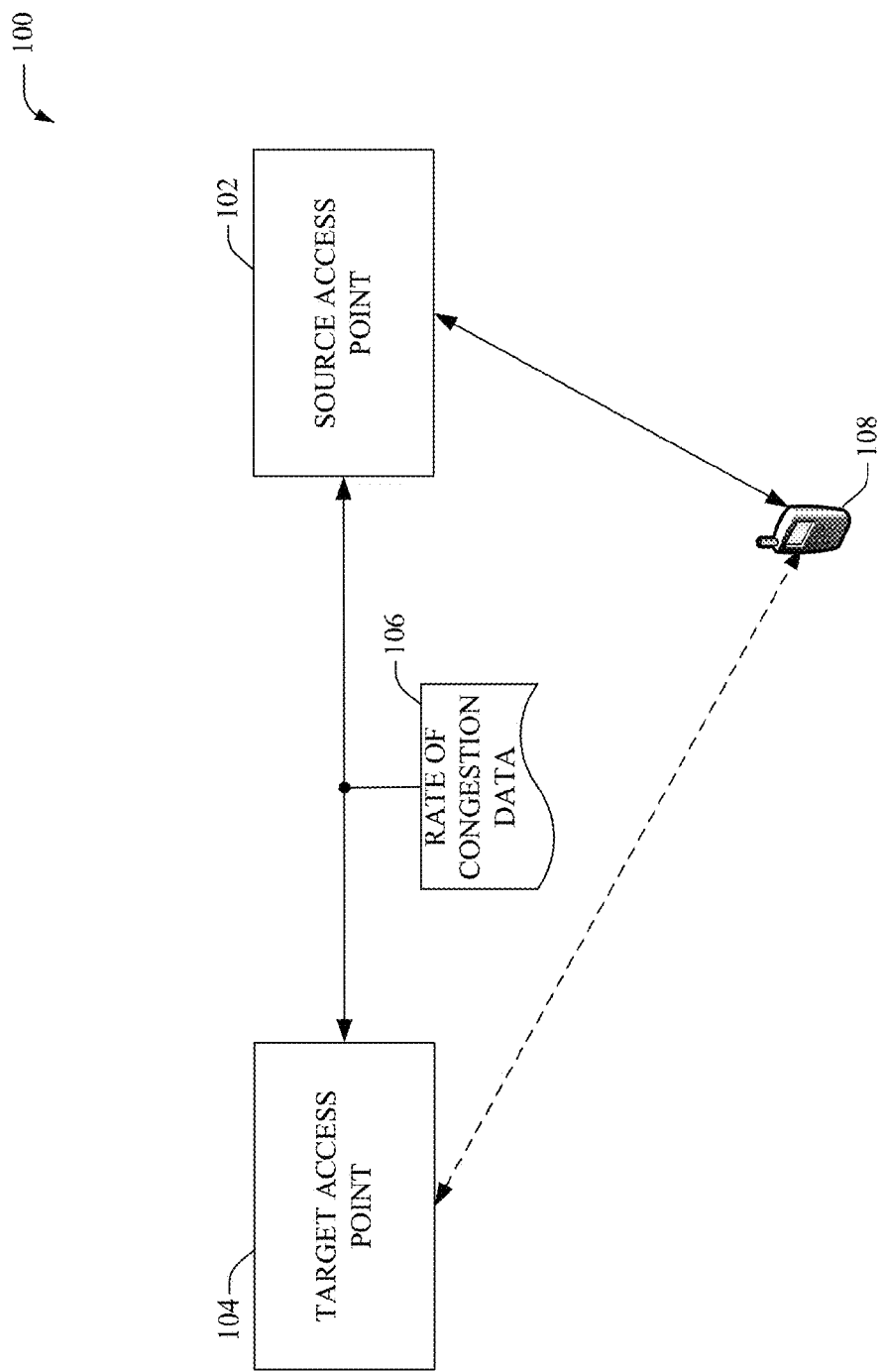
FIG. 1 illustrates an example system that facilitates a transfer of rate of congestion data between access points in a communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile terminal," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies and/or future telecommunication technologies (e.g., 5G).

Furthermore, the terms "user," "subscriber," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The systems and methods disclosed herein facilitate enhancing network steering and/or load balancing decisions by utilization of rate of congestion data associated with a cell site. As an example, the terms "traffic steering" as used herein can refer to directing, attempting to direct, and/or instructing to direct or deliver, via a first access point, at least a portion of traffic (data flows/packets) associated with a communication device that is coupled to and/or communicating via a second access point. In one aspect, a source cell site can receive information indicative of a speed or rate of congestion of a target cell site and utilize the information to ascertain whether traffic from a user equipment, coupled to the source cell site, should be steered to the target cell site. For example, if determined that the target cell site is congesting quickly at a high rate, it may not be a desirable/ optimal cell to handover to. Understanding the rate of congestion variable can reduce congestion and result in stronger network performance.

Referring initially to FIG. 1, there illustrated is an example system 100 that facilitates a transfer of a rate of congestion data between access points in a communication network, according to one or more aspects of the disclosed subject matter. System 100 can be part of a communication network (e.g., cellular network) and can include a source access point 102 and a target access point 104. In one aspect, the source access point 102 and/or the target access point 104 can be part of a self optimizing network (SON). As an example, the access points (102, 104) can include, but are not limited to, a base station, an eNodeB, a picostation, a WiFi access point, a femto access point, a HomeNodeB, etc. In one aspect, the source access point 102 and the target access point 104 are neighboring access points such that, the coverage areas of the source access point 102 and the target access point 104 at least partially overlap to facilitate handover between the cell sites. Further, although only one target access point 104 is depicted in FIG. 1, the subject specification is not so limited and system 100 can comprise one or more target access points.

In one embodiment, target access point 104 can determine rate of congestion data 106 associated with the target access point 104. For example, the rate of congestion can represent a change in congestion/load/traffic during a defined time interval (e.g., 5 minutes, 10 minutes, etc.). Moreover, the rate/speed of congestion helps determine how fast the target cell is being congested. The target access point 104 can transmit (e.g., periodically, on demand, in response to determining a change in the rate of congestion data, etc.) the rate of congestion data 106 to one or more neighboring access points for example, source access point 102. In one aspect, the source access point 102 can utilize the rate of congestion data 106 to determine whether traffic from one or more user equipment (UE), for example, UE 108, that are coupled to the source access point 102, is to be steered to the target access point 104. As an example, if the rate of congestion is low (e.g., below a defined threshold value), the traffic from UE 108 can be steered to the target access point 104; else, if the rate of congestion is high (e.g., equal to or above the defined threshold value), the traffic from UE 108 can be steered to another target access point (not shown) and/or the traffic from UE 108 can continue to be communicated via the source access point 102.

In one aspect, the steering decision can be made by the source access point 102, which can instruct the UE 108 to steer the traffic to a selected (e.g., based in part on the rate of congestion data 106) target access point. In another aspect, the source access point 102 can forward (e.g., via a set of cell broadcast messages) the rate of congestion data 106 to the UE 108 and the UE 108 can make the steering decision based on the rate of congestion data 106. In yet another aspect, the UE 108 and/or the source access point 102 are not limited to solely/independently making a network selection decision for traffic steering and can participate in a joint selection process with one or more devices (not shown) that are coupled to the UE 108 and/or the source access point 102 to facilitate selection of a target access point to which traffic is to be steered. Moreover, if determined (e.g., based in part on the rate of congestion data 106) that traffic associated with the UE 108 is to be steered to the target access point 104, then the UE 108 can communicate one or more data flows via the target access point 104 (e.g., depicted by the dotted line in FIG. 1). As an example, the UE 108 can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UE 108 can also include, LTE-based devices, such as, but not limited to, most any home or commercial appliance that includes an LTE radio. It can be noted that UE 108 can be mobile, have limited mobility and/or be stationary. In one example, UE 108 can include a multi-band, multi-mode, and/or multi-radio device.

Figure 2:
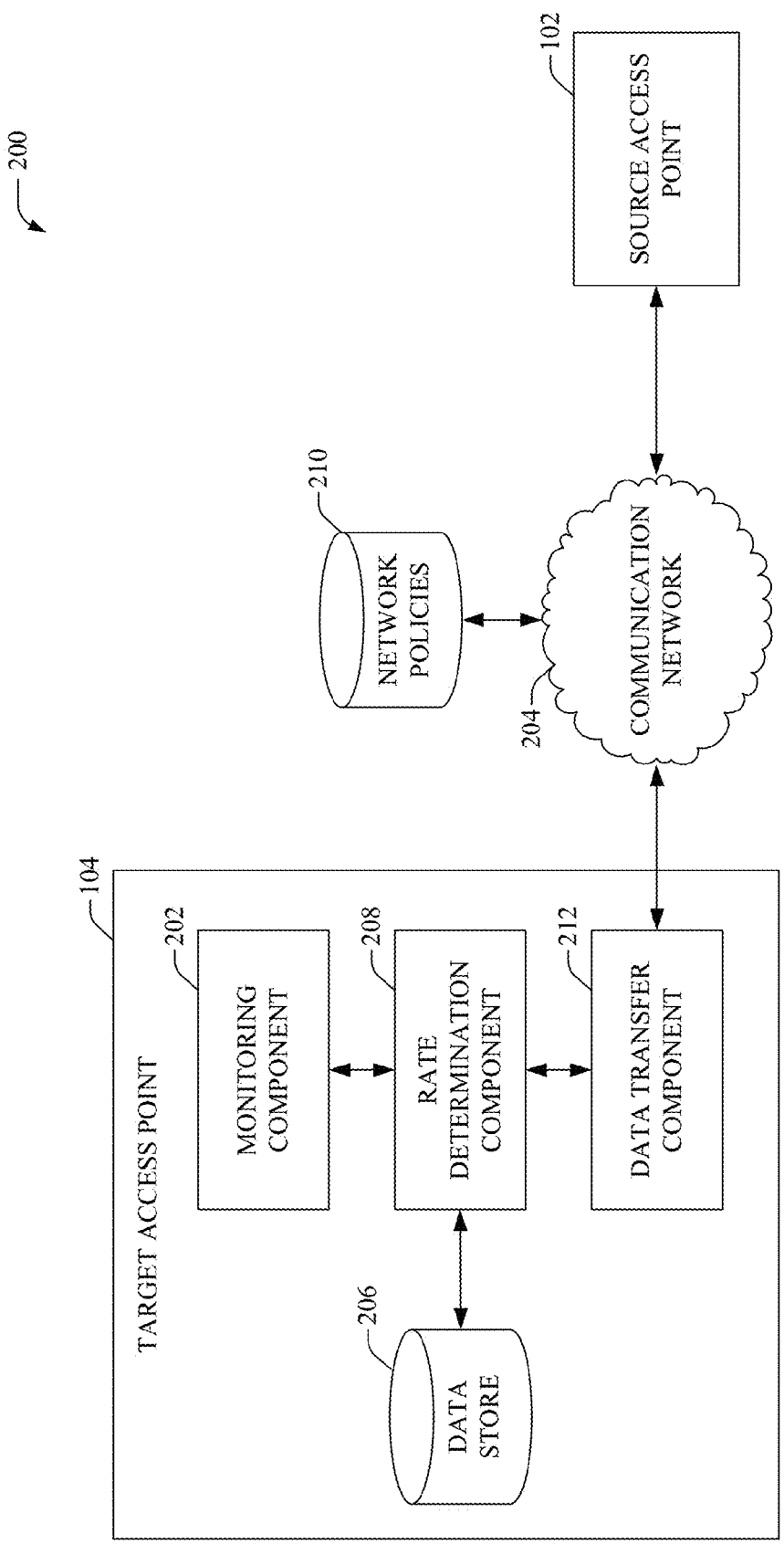
FIG. 2 illustrates an example system for determining rate of congestion data that is employed to facilitate traffic steering.

Referring now to FIG. 2, there illustrated is an example system 200 for determining rate of congestion data that is employed to facilitate traffic steering, in accordance with an aspect of the subject disclosure. In one aspect, system 200 facilitates determination of rate of congestion data associated with a target access point 104 that can be utilized by a set of neighboring access points (e.g., source access point 102) to facilitate traffic steering and/or load-balancing. It is noted that the source access point 102 and the target access point 104 can include functionality as more fully described herein, for example, as described above with regard to system 100. In one example, the target access point 104 can include, but is not limited to an access point that is operated and/or deployed by a service provider of the communication network 204, and that utilizes the same or different radio technologies for communication with the UEs (e.g., UE 108) as utilized by source access point 102.

According to an embodiment, the target access point 104 can include a monitoring component 202 that is utilized to monitor (e.g., continuously and/or periodically) current network load conditions associated with the target access point 104. As an example, the monitoring component 202 can determine load utilization on radio links (e.g., between target access point 104 and UEs served by the target access point 104) and/or a transport link (e.g., between target access point 104 and the communication network 204. Additionally, or optionally, the monitoring component 202 can observe load data such as, but not limited to, a number of UEs currently served by the target access point 104, bandwidth utilization of the target access point 104, an amount of traffic flowing via the target access point 104, available/remaining bandwidth/capacity, etc. In one aspect, the monitoring component 202 can also determine and/or assign timing data (e.g., timestamps) to the observed information. The observed information can be stored by the monitoring component 202 in data store 206 (and/or a remote data store (not shown)). It is noted that the data store 206 can include volatile memory(s) or nonvolatile memory(s), or can include both volatile and nonvolatile memory(s). Examples of suitable types of volatile and non-volatile memory are described below with reference to FIG. 14. The memory (e.g., data stores, databases) of the subject systems and methods is intended to comprise, without being limited to, these and any other suitable types of memory.

In one aspect, a rate determination component 208 can utilize the stored information to calculate a rate and/or speed of congestion. For example, the rate determination component 208 can identify how quickly the target access point is getting congested (e.g., how fast the congestion level is rising towards a maximum congestion level, how fast the congestion level is reducing towards a minimum congestion level, etc.). In one aspect, the rate determination component 208 can determine congestion values (e.g., stored in data store 206) at different times, for example every ten minutes to determine a change in the congestion value over time. Additionally, or optionally, the rate determination component 208 can normalize the rate of congestion value. For example, an index number "0" could be assigned to the rate of congestion to indicate that the rate of congestion has not changed or to indicate a negative rate of change (e.g., traffic via the target access point 104 is steady or decreasing). Further, "1" can indicate a 10-19 percent increase in the rate of traffic over a 10 minute interval; "2" can indicate a 20-29 percent increase in the rate of traffic over a 10 minute interval; "3" can indicate a 30-39 percent increase in the rate of traffic over a 10 minute interval; and so on. It is noted that the rate of congestion data is not limited to the above index values, and can comprise most any normalization and/or classification technique. For example, the rate determination component 208 can classify the rate of congestion as "low," "regular," "high," etc. based on predefined threshold values. Typically, during steady traffic conditions within the network (e.g., non-event traffic, non-busy hour traffic), rate of congestion can be very low or non-existent therefore weighted low but during heavy traffic conditions (e.g., event traffic, busy hour traffic) rate of congestion is weighted high and will greatly influence mobility to the target access point 104.

The normalized and/or classified rate of congestion value can then be transmitted to neighboring access points (e.g., source access point 102) by the data transfer component 212, for example, based on operator-defined network policies 210. As an example, the data transfer component 212 can transmit the rate of congestion information, via X2 interfaces enabled by Self Organizing Network (SON) and/or most any other transport mechanisms. Moreover, the data transfer component 212 can transmit the rate of congestion data at various times, such as, but not limited to, periodically, on demand, based on detecting an event, based on detecting a change in the rate of congestion, based on determining that the rate of congestion exceeds a defined threshold, based on receiving a query from the source access point device, etc. In one embodiment, the rate of congestion data can be included within or appended to a resource status update message, for example, a RIM (Radio Access Network (RAN) Information Message) that contains other information, such as (but not limited to) current network load of the target access point device. Alternatively, the rate of congestion data can be transmitted as a new/separate message. The source access point 102 can utilize the rate of congestion data to enhance traffic steering decisions.

Figure 3:
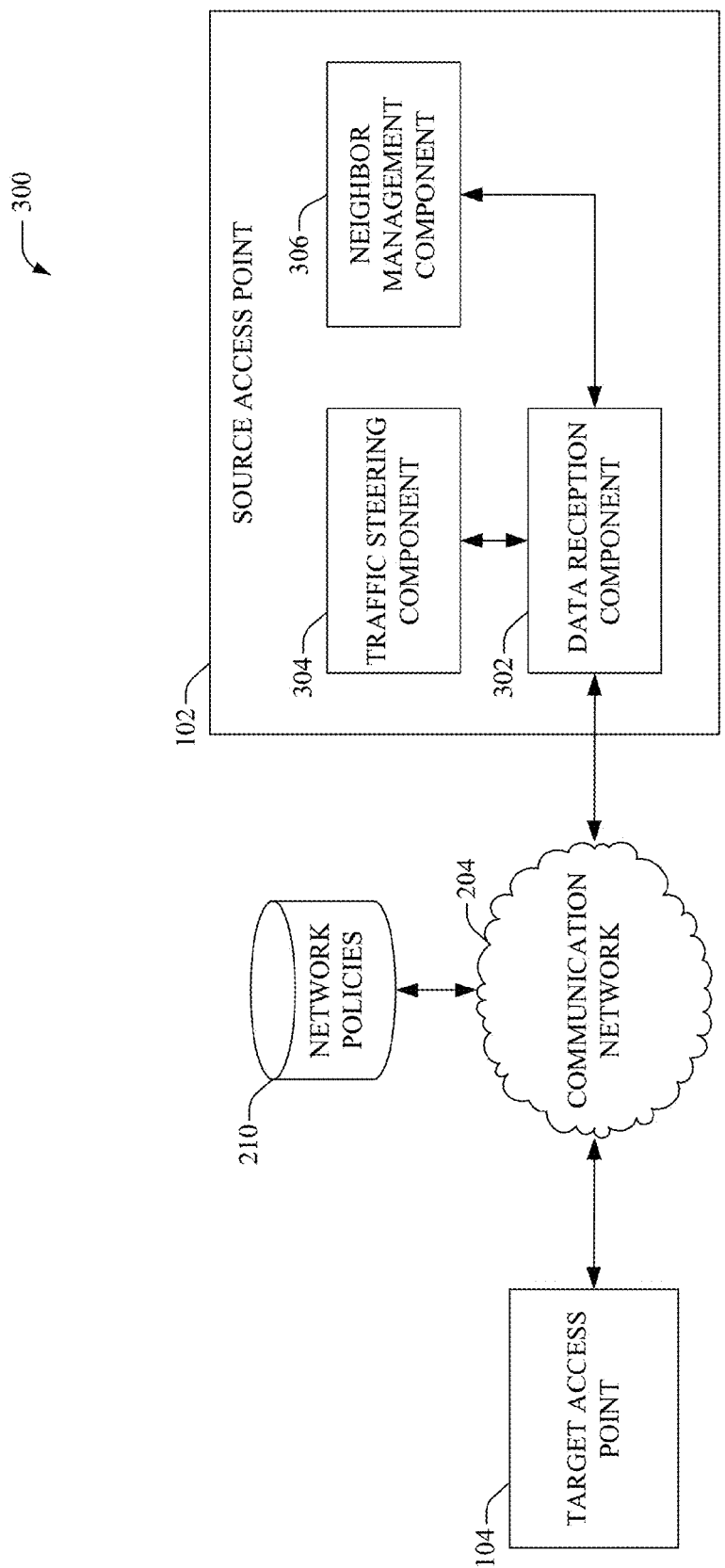
FIG. 3 illustrates an example system that utilizes rate of congestion data of target access points to facilitate efficient network selection.

Referring now to FIG. 3, there illustrated is an example system 300 that utilizes rate of congestion data of a target access point devices to facilitate efficient network selection, according to an aspect of the subject disclosure. It is noted that the source access point 102, the target access point 104, communication network 204, and the network policies 210 can include functionality as more fully described herein, for example, as described above with regard to systems 100 and 200.

In one aspect, a data reception component 302 can receive the rate of congestion data transmitted by one or more neighboring access point devices, including, the target access point 104 (e.g., via a RIM). Additionally, or optionally, the data reception component can also receive current load of the one or more neighboring access points. As an example, the data reception component 302 can parse the received message(s) and provide the rate of congestion data to a traffic steering component 304 and/or a neighbor management component 306. The traffic steering component 304 analyzes the rate of congestion data to determine whether traffic from a UE coupled to the source access point 102 should be steered to the target access point 104 (e.g., if the load of the source access point 102 has increased above a threshold value). In one aspect, the traffic steering component 304 can determine whether the rate of congestion data satisfies a predefined criterion (e.g., set based on the network policies 210). For example, the traffic steering component 304 can compare the rate of congestion index value to a threshold value and/or range. If the rate of congestion index value is lower than the threshold value (and/or within the range), the traffic steering component 304 can instruct one or more UEs (e.g., UE 108), coupled to the source access point 102 to connect to the target access point 104 and steer at least a portion of their traffic via the target access point 104. It is noted that the UEs are not limited to communicating all data (e.g., IP flows) through the new network and that the UEs can select a first portion of data (e.g., select a first set of IP flows) that can be communicated via the target access point 104 and a second portion of data (e.g., select a second set of IP flows) that can be communicated via the source access point 102. As an example, the selection of the data (e.g., IP flows) can be based on network policies 210, e.g., using an access network discovery and selection function (ANDSF). Alternatively, if the rate of congestion index value is higher than the threshold value (and/or outside the range), the traffic steering component 304 can determine that the target access point 104 is not an optimal candidate for traffic steering and can select another access point (not shown) via which the UEs can communicate and/or can instruct the UEs to continue communicating via the source access point 102.

In addition to the rate of congestion data, the traffic steering component 304 can utilize the current network load data of the target access point 104 to further enhance the traffic steering decision. Moreover, the traffic steering component 304 can bias mobility parameters based on the current load condition and the rate of congestion. A weighting on the rate of congestion can be dynamically and automatically adjusted based on load and rate triggering thresholds. As an example, when the load index is greater than 80% and the rate of congestion index value is "7" (e.g., that indicates a 70 percent increase in the rate of traffic over a 10 minute interval), the weighting of the rate of congestion variable would be high and result in the target access point 104 being assigned a negative bias to reduce the amount of traffic to that cell.

Although depicted as completely residing within the source access point 102, it can be noted that the traffic steering component 304 can be distributed among multiple devices, such as, but not limited to, a network device and/or a UE (not shown). For example, the network device can determine the biased mobility parameters and the source access point 102 can simply forward the mobility parameters and/or instructions to steer traffic, to the UEs coupled to the source access point 102. Alternatively, the source access point 102 can simply forward (e.g., via a cell broadcast message) the rate of congestion data (and the current load data) received from the target access point 104 to the UEs, which in turn can analyze the information to determine and/or bias mobility parameters and select a radio access network via which traffic is to be communicated.

In one embodiment, the rate of congestion data can also be utilized by a neighbor management component 306 that manages neighbor relations to dynamically prioritize/rank neighbor cell sites based on rate of congestion data. Moreover, the neighbor management component 306 can update a Neighbor Relation Table (NRT) (not shown). In one aspect, based on the rate of congestion data, identifier data representing the target access point 104 can be added to, deleted from, and/or ranked higher/lower, in the table. For example, if the rate of congestion has increased, the ranking of the target access point 104 can be decreased (and/or vice versa) and/or the data representing the target access point 104 can be removed from the NRT.

According to an optional embodiment, the data reception component 302 can receive network load data of the target access point 104 along with timestamps indicative of a time at which the load condition occurred/was measured. Based on the network load data and the timestamps, the traffic steering component 304 can determine rate of congestion at the target access point 104, and utilize the rate of congestion data to facilitate traffic steering. Similarly, the neighbor management component 306 can also determine the rate of congestion at the target access point 104 based on the network load data and the timestamps, and utilize the rate of congestion data to facilitate management of neighbor relations.

Figure 4:
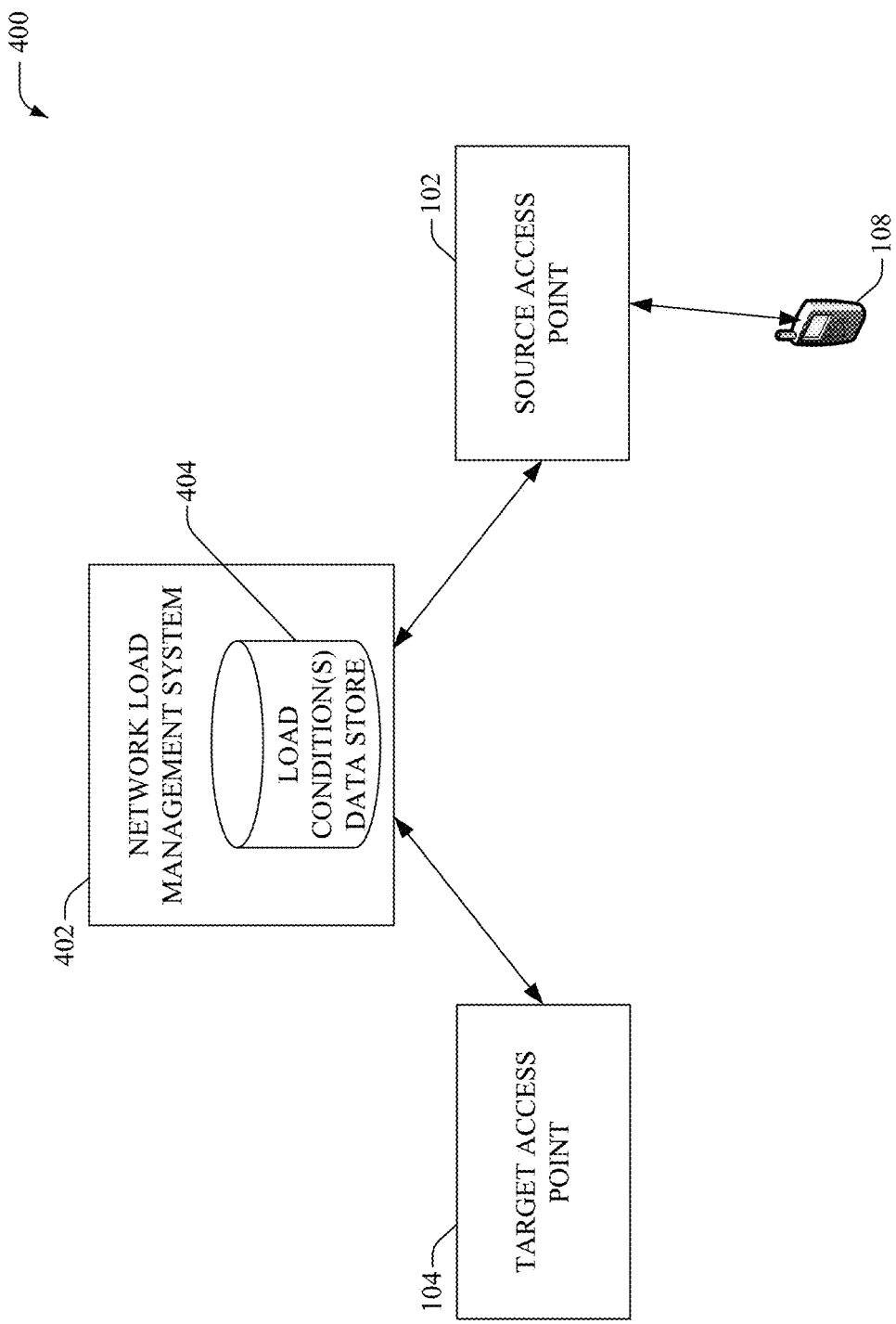
FIG. 4 illustrates an example system that facilitates query-based traffic steering.

Referring now to FIG. 4, there illustrated is an example system 400 that facilitates query-based traffic steering, according to one or more aspects of the disclosed subject matter. It can be noted that the source access point 102, the target access point 104, and UE 108 can include functionality as more fully described herein, for example, as described above with regard to systems 100-300.

In one aspect, the target access point 104 can determine (e.g., by employing the rate determination component 208) a rate of congestion of the target access point 104 that represents how quickly the target access point 104 is getting congested. Further, the target access point 104 can transmit (e.g., by employing the data transfer component 212) the rate of congestion data to a network load management system 402 of the communication network. It can be noted that the network load management system 402 can be locally coupled to the source access point 102 and/or the target access point 104, for example, located within the radio access network (RAN) (e.g., be part of the SON) or can be located elsewhere within the communication network. Moreover, the network load management system 402 can store data received from one or more access points, including target access point 104, in a load condition(s) data store 404. This stored data can be accessed by the source access point 102, for example, if the source access point 102 does not directly receive the rate of congestion data from the target access point 104. It can be noted that the network load management system 402 can collect the rate of congestion data in a pull configuration with the one or more access points (e.g., target access point 104) and/or receive the rate of congestion data pushed by one or more access points (e.g., target access point 104).

According to an aspect, the source access point 102 (and/or UE 108) can initiate a query for the rate of congestion data. As an example, the query can be transmitted periodically (e.g., based on predefined timing intervals), on-demand, in response to an event, etc. In response to receiving the query, the network load management system 402 can identify access points that are neighboring the source access point 102 (including target access point 104), lookup load condition data (e.g., rate of congestion data) received from the neighboring access points in the load condition(s) data store 404, and transmit the data to the source access point 102 (and/or UE 108).

In an aspect, the query generated by the source access point 102 (and/or UE 108) can include data such as (but not limited to) the served physical cell ID (PCI) of the source access point 102, the cell identifier (ID) associated with the source access point 102, the Basic Service Set IDentifier (BSSID) and/or the Service Set Identifier (SSID) (if the RAN includes or is otherwise capable of receiving load information from a nearby a WiFi network). Based on the PCI/SSID/BSSID, the network load management system 402 can identify the network sectors corresponding to the source access point 102 and/or the one or more neighboring access points (e.g., target access point 104), dynamically determine (and/or lookup) the corresponding network load information (e.g., rate of congestion data), and transmit the determined information to the source access point 102 (and/or UE 108). The source access point 102 (and/or UE 108) can receive the rate of congestion data (e.g., via the data reception component 302) and analyze the rate of congestion data to facilitate traffic steering and/or update mobility parameters.

Figure 5:
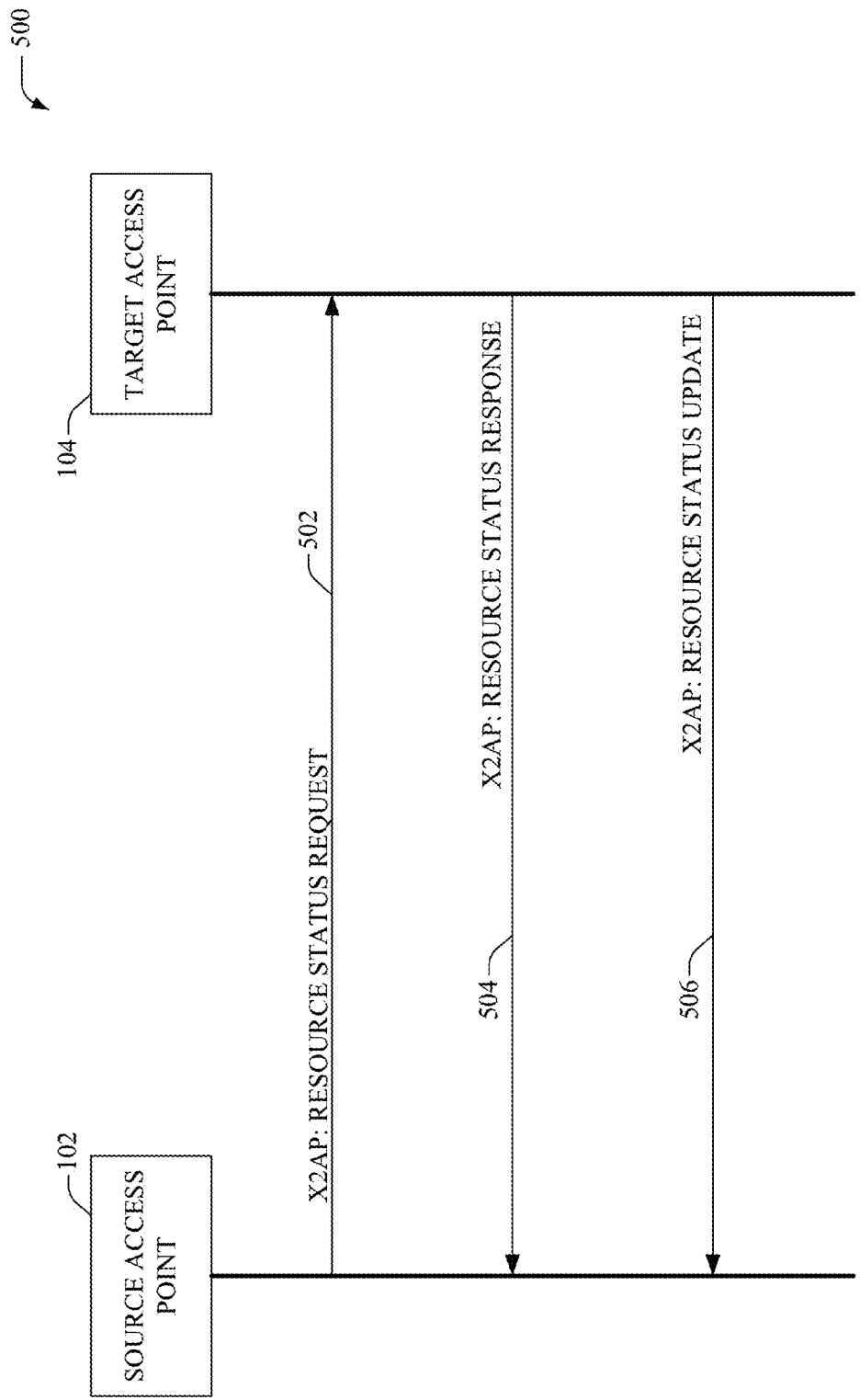
FIG. 5 illustrates an example flow diagram that depicts a transfer of rate of congestion data between access points in a Long Term Evolution (LTE) network.

FIG. 5 illustrates an example flow diagram 500 that depicts a transfer of rate of congestion data between access points in an LTE network. In this example scenario, source access point 102 and target access point 104 are eNBs in an LTE communication network. It can be noted that the source access point 102 and the target access point 104 can include functionality as more fully described herein, for example, as described above with regard to systems 100-400. As an example, the source access point 102 and the target access point 104 can communicate via an X2 Application Protocol (X2AP) to exchange load measurement data. At 502, the source access point 102 can transmit a Resource Status Request to the target access point 104 to initiate transfer of load measurement data from the target access point 104. In one aspect, the Resource Status Request can request for the rate of congestion data. As an example, a rate of congestion indicator can be included as a bit (e.g., sixth bit) in a bitmap provided in the request. In addition, the Resource Status Request can request various other load measurements, such as, but not limited to, current load, bandwidth utilization, number of UEs currently coupled to the target access point 104, etc. On receiving the Resource Status Request, the target access point 102 can perform requested load measurement data based on the parameters specified in the Resource Status Request and/or determine (e.g., lookup) saved measurement data from data store 206.

At 504, the target access point 104 can then transmit a Resource Status Response indicative of a set of the requested load measurements that are available (e.g., results are available, measurements can be performed, etc.) and that can be provided to the source access point 102. If none of the measurements are available, the resource status response can be indicative of a failure message. Further, at 506, a Resource Status Update is transmitted from the target access point 104 to the source access point 102 with the available load measurements (e.g., including the rate of congestion indicator). As an example, the source access point 102 can utilize the load measurements to facilitate load balancing and/or intelligent traffic steering.

Figure 6:
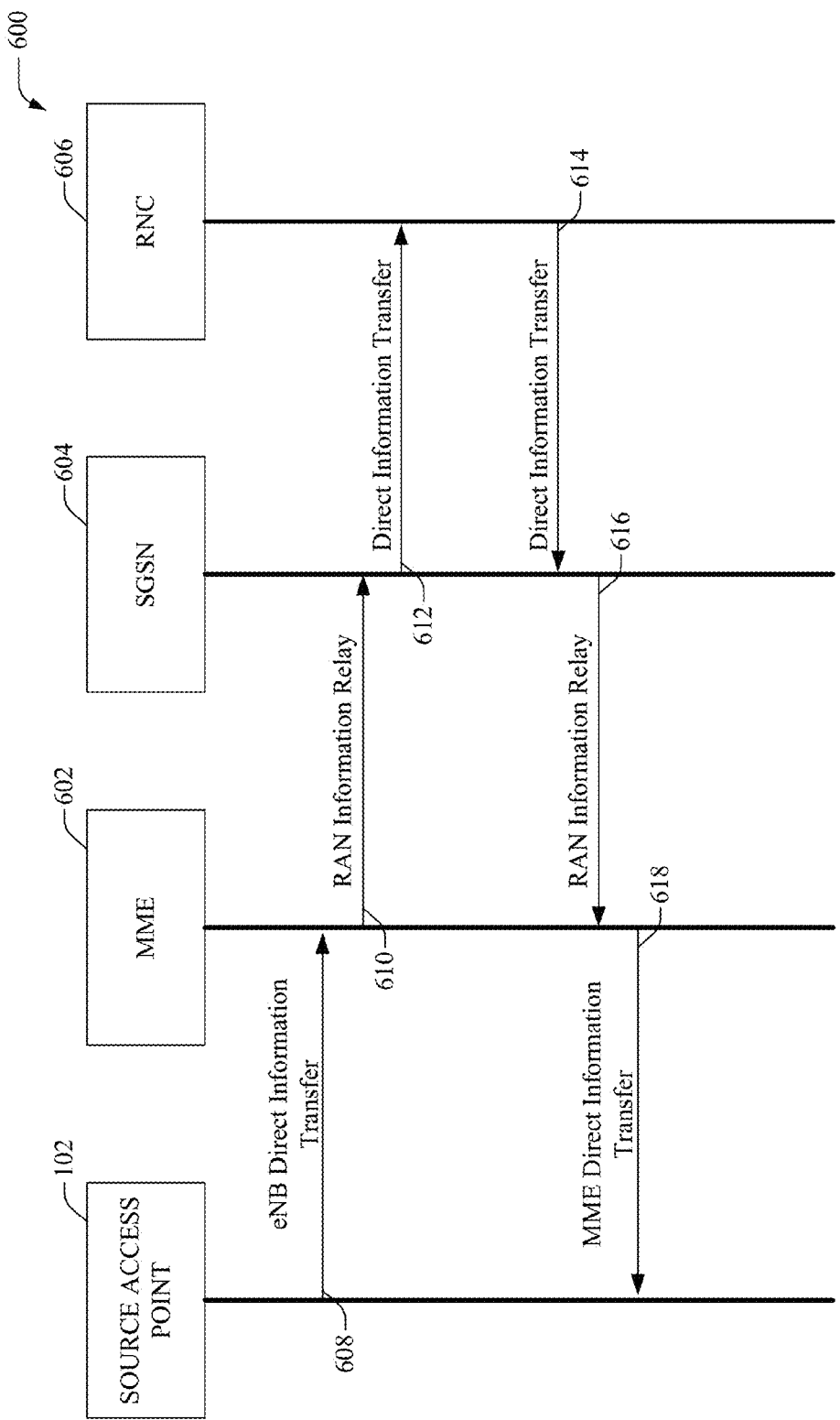
FIG. 6 illustrates an example flow diagram that depicts a transfer of rate of congestion data from a Universal Mobile Telecommunications System (UMTS) network to an LTE network.

FIG. 6 illustrates an example flow diagram 600 that depicts a transfer of rate of congestion data from a UMTS network to an LTE network. In this example scenario, source access point 102 is an eNB in an LTE communication network, while the target access point 104 (not shown) is a base station within a UMTS network. It can be noted that the source access point 102 can include functionality as more fully described herein, for example, as described above with regard to systems 100-400. As an example, the UMTS network can comprise a mobility management entity (MME) 602, a serving GPRS support node (SGSN) 604 and a radio network controller (RNC) 606. In one aspect, at 608, the source access point 102 can transmit an eNB Direct Information Transfer message to the MME 602 to request for load measurements (e.g., including rate of congestion data) from neighboring cell sites (e.g., including target access point 104). At 610, the MME 602 can forward the request to the SGSN 604 via a RAN Information Relay message and at 612, the SGSN 604 can forward the request to the RNC 606 via a Direct Information Transfer message. The RNC is coupled to the target access point 104 and can request and receive, from the target access point 104, load measurement data, including, but not limited to, rate of congestion data associated with the target access point 104. At 614, the RNC 606 can encapsulate the load measurement data in a Direct Information Transfer message that can be sent to the SGSN 604. At 616, the SGSN 604 can transfer the load measurement data to the MME 602 via a RAN Information Relay message and at 618, the MME 602 can forward the load measurement data to the source access point 102 via an MME Direct Information Transfer message. As an example, the source access point 102 can utilize the load measurements to facilitate load balancing and/or intelligent traffic steering.

Figure 7:
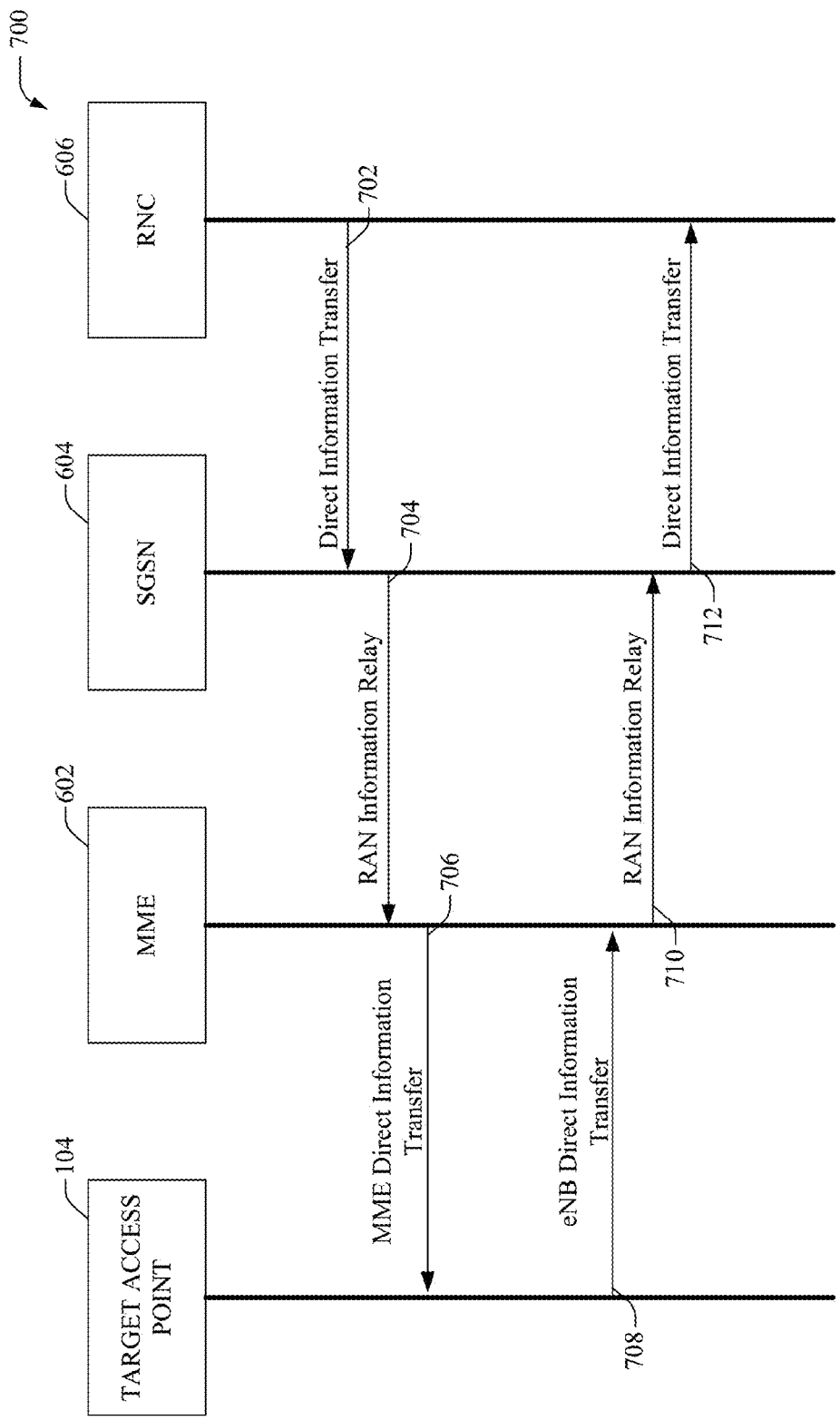
FIG. 7 illustrates an example flow diagram 700 that depicts a transfer of rate of congestion data from an LTE network to a UMTS network.

FIG. 7 illustrates an example flow diagram 700 that depicts a transfer of rate of congestion data from an LTE network to a UMTS network. In this example scenario, target access point 104 is an eNB in an LTE communication network, while the source access point 102 (not shown) is a base station within a UMTS network. It can be noted that the target access point 104, MME 602, SGSN 604, and RNC 606 can include functionality as more fully described herein, for example, as described above with regard to systems 100-600. In one aspect, the RNC 606 can be coupled to and can control the source access point 102 (not shown), which can request for load measurements from neighboring cell sites (e.g., including target access point 104) via the RNC 606. At 702, the RNC 606 can transmit a Direct Information Transfer message to the SGSN 604 to request for the load measurement data (e.g., including rate of congestion data). At 704, the SGSN 604 can forward the request to the MME 602 via a RAN Information Relay message and at 706, the MME 602 can forward the request to the RNC 606 via an MME Direct Information Transfer message. On receiving the MME Direct Information Transfer message, the target access point 104 can perform requested load measurements based on the parameters specified in the Direct Information Transfer message and/or determine (e.g., lookup) saved measurement data from data store 206.

At 708, the target access point 104 can transmit the load measurement data (e.g., including rate of congestion data) to the MME 602. At 710, the MME 602 can forward the load measurement data to the SGSN 604 via a RAN Information Relay message and at 712, the SGSN 604 can transfer the load measurement data to the RNC 606 via a Direct Information Transfer message. The RNC 606 can then transfer the load measurement data to the target access point 104, which can utilize the rate of congestion data to facilitate load balancing and/or intelligent traffic steering. It is noted that the subject specification is not limited to communication messages (e.g., X2AP: Resource Status Request, X2AP: Resource Status Response, X2AP: Resource Status Update, eNB Direct Information Transfer, RAN Information Relay, Direct Information Transfer, and MME Direct Information Transfer) depicted in FIGS. 5-7 and that most any communication messaging protocols can be utilized to transfer the rate of congestion data between access points. Further, it can be noted that although described herein as a cellular access point, the target access point 104 can also be an access point associated with a wireless local area network, WiFi access point, etc.

Figure 8:
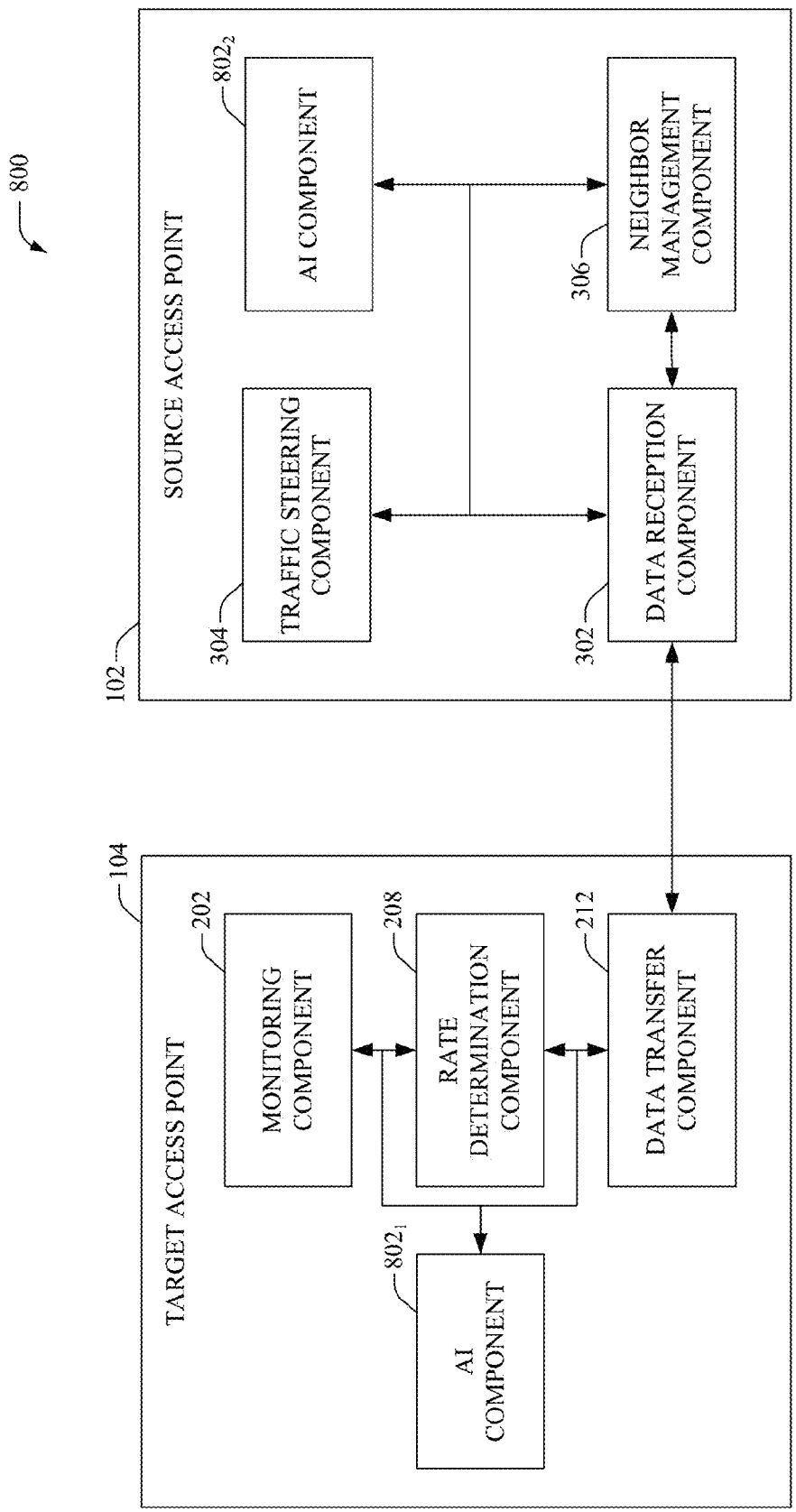
FIG. 8 illustrates an example system that facilitates automating one or more features in accordance with the subject embodiments.

Referring now to FIG. 8, there illustrated is an example system 800 that employs one or more artificial intelligence (AI) components (802$_1$, 802$_2$), which facilitate automating one or more features in accordance with the subject embodiments. It can be appreciated that the source access point 102, the target access point 104, the monitoring component 202, the rate determination component 208, the data transfer component 212, the data reception component 302, the traffic steering component 304 and the neighbor management component 306 can include respective functionality, as more fully described herein, for example, with regard to systems 100-700.

In an example embodiment, system 800 (e.g., in connection with automatically determining parameters for monitoring network load, data transfer parameters, traffic steering criteria, neighbor relationships, etc.) can employ various AI-based schemes for carrying out various aspects thereof. For example, a process for determining an optimal time/ schedule to monitor rate of congestion, an optimal time/ schedule to transfer the rate of congestion data, etc. can be facilitated via an automatic classifier system implemented by AI component 802$_1$. Additionally, or alternatively, a process for determining whether UEs are to be steered to the target access point 104 to efficiently reduce network congestion at the source access point 102 without negatively impacting user experience, determining which RAN network is to be selected, determining when a query for load measurement data is to be transmitted, etc. can be facilitated via an automatic classifier system implemented by AI component 802$_2$.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from UEs and/or access points, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing access point/ UE behavior, user/operator preferences, historical information, receiving extrinsic information, network load/congestion trends, type of UE, type of target RAN, etc.). For example, SVMs can be configured via a learning or training phase within a classifier constructor and feature selection module. Thus, the classifier(s) of AI component 802$_1$ can be used to automatically learn and perform a number of functions, including but not limited to determining according to a predetermined criterion when and/or or to which devices is the rate of congestion data to be transmitted, a schedule according to which the rate of congestion is to be monitored, the time interval utilized to calculate the rate of congestion, etc. Further, the classifier(s) of AI component 802$_2$ can be used to automatically learn and perform a number of functions, including but not limited to determining according to a predetermined criterion a RAN to which the UEs coupled to source access point 102 are to be handed over, a bias assigned to a mobility parameter, a rate triggering threshold, a time at which a query for rate of congestion data is to be transmitted (e.g., to target access point 104), etc. The criteria can include, but is not limited to, historical patterns and/or trends, user preferences, service provider preferences and/or policies, location of the access point, current time, type of target RAN (e.g., macro cell, femtocell, WiFi network, etc.), network load, and the like.

Figure 9:
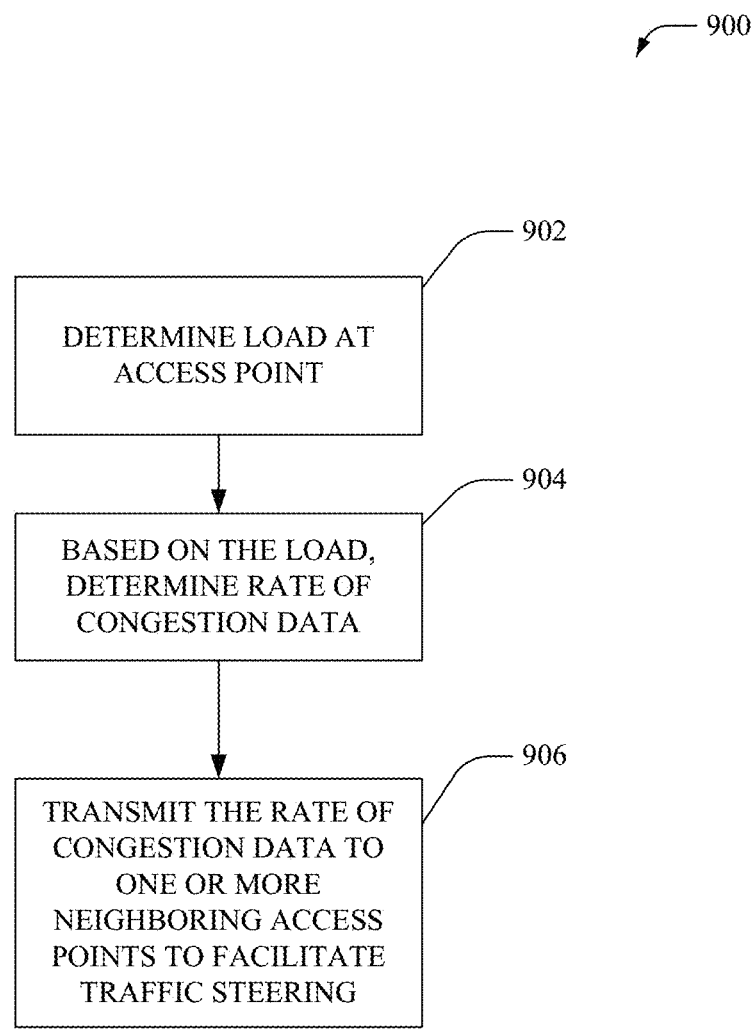
FIG. 9 illustrates an example method that facilitates a transmission of rate of congestion data that is to be employed for efficient traffic steering.
Figure 10:
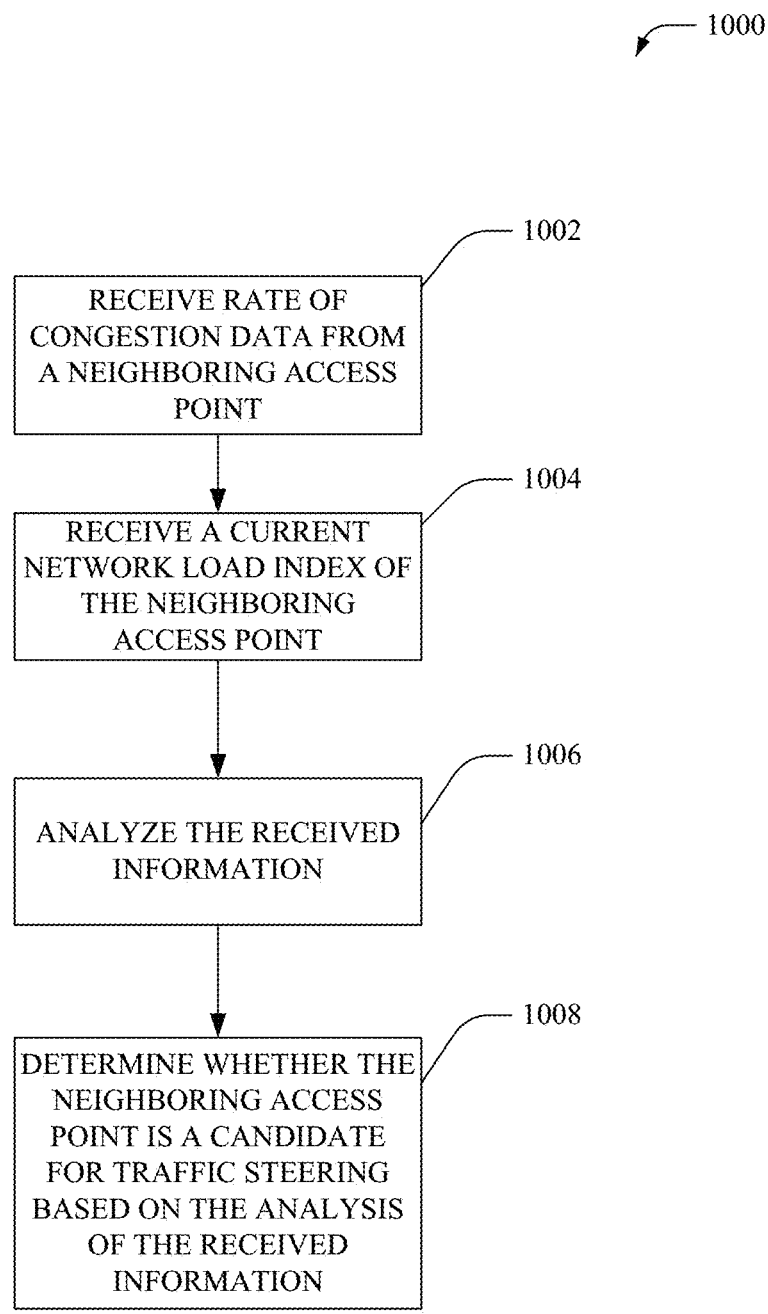
FIG. 10 illustrates an example method that facilitates network selection to efficiently steer traffic associated with a user equipment (UE) from a first radio access network (RAN) to a second RAN.
Figure 11:
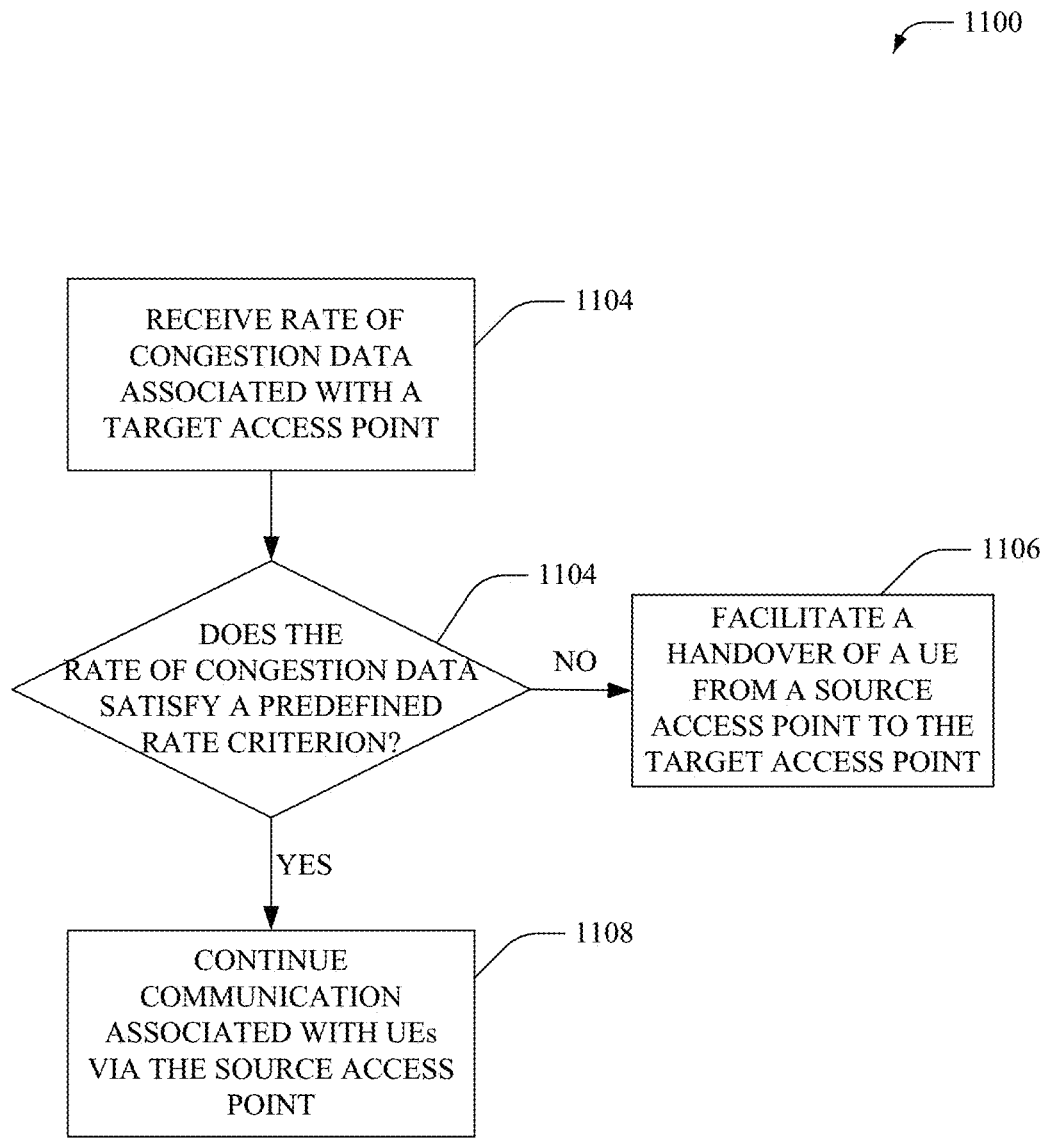
FIG. 11 illustrates an example method for determining whether traffic associated with a UE is to be steered from a source access point to a target access point.

FIGS. 9-11 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/ communications media.

Referring now to FIG. 9, illustrated is an example method 900 that transmits rate of congestion data, which is employed to facilitate efficient traffic steering, according to an aspect of the subject disclosure. As an example, method 900 can be implemented by one or more network devices of RAN, for example, a target access point (e.g., base station, eNB, HNB, HeNB, etc.) In another example, method 900 can be implemented by one or more devices of a core mobility network (e.g., a network load management system).

At 902, network load associated with the target access point and/or RAN can be determined. As an example, the network load can represent load utilization on radio links (e.g., between the access point and one or more UEs) and/or a transport link (e.g., between the access point and the core mobility network). At 904, rate of congestion data can be determined, for example, based on network load values monitored over a defined time interval. As an example, the rate of congestion can represent a change in congestion/ load/traffic during a defined time interval (e.g., 5 minutes, 10 minutes, etc.). Moreover, the rate/speed of congestion helps determine how fast the target cell is moving towards a congested state (e.g., maximum capacity). Additionally, or optionally, the rate of congestion data can be indicative of a normalized value representing the rate of congestion at the target access point. For example, an index number "0" could be assigned to the rate of congestion to indicate that the rate of congestion has not changed (e.g., traffic via the target access point is steady). Further, "−1" can indicate a 10-19 percent decrease in the rate of traffic over a 10 minute interval; "−2" can indicate a 20-29 percent decrease in the rate of traffic over a 10 minute interval; "1" can indicate a 10-19 percent increase in the rate of traffic over a 10 minute interval; "2" can indicate a 20-29 percent increase in the rate of traffic over a 10 minute interval and so on. It is noted that the rate of congestion data is not limited to the above index values, and can comprise most any normalization and/or classification technique. For example, the rate of congestion can be classified as "low," "regular," "high," etc. based on predefined threshold values.

Further, at 906, the rate of congestion data can be transmitted to neighboring access points (e.g., access points that are within a predefined distance from the target access point, access points that have at least partially overlapping coverage areas, etc.) to facilitate traffic steering associated with UEs that are served by the neighboring access points. For example, if the rate of congestion of the target access point is low (e.g., below a defined threshold), one or more data flows associated with the UEs can be communicated via the target access point. In one aspect, the rate of congestion data can be transmitted to the neighboring access points periodically, on demand, in response to determining a change in the rate data, etc.

FIG. 10 illustrates an example method 1000 that facilitates network selection to efficiently steer traffic associated with a UE from a first RAN to a second RAN, according to an aspect of the subject disclosure. As an example, method 1000 can be implemented by a source access point (and/or UE coupled to the source access point) to determine whether a connection to a new network is to be performed. At 1002, rate of congestion data can be received, for example, from a neighboring access point (e.g., target access point) of the second RAN. At 1004, a current network load index of the neighboring access point can also be received, for example, from the neighboring access point. As an example, the rate of congestion data and the current load index can be received in the same or different messages. At 1006, the received information can be analyzed and at 1008, it can be determined, based on the analysis, whether the neighboring access point is a candidate for traffic steering.

In one aspect, mobility parameters can be biased based on the current load index and the rate of congestion of the neighboring access point. A weighting on the rate of congestion can be dynamically and automatically adjusted based on the current load index and rate triggering thresholds. As an example, when the current load index is greater than 75% and the rate of congestion index value is "8" (e.g., that indicates an 80 percent increase in the rate of traffic over a 10 minute interval), the weighting of the rate of congestion variable would be high and result in the neighboring access point being assigned a negative bias to reduce the amount of traffic steered to that cell. In another example, when the load index is greater than 75% and the rate of congestion index value is "−2" (e.g., that indicates a 20 percent decrease in the rate of traffic over a 10 minute interval), the weighting of the rate of congestion variable would be low and result in the neighboring access point being assigned a positive bias to increase the amount of traffic steered to that cell. It can be noted that various additional parameters such as (but not limited to) device preferences, application preferences, user defined policies, operator/service provider-defined policies, etc. can be employed to facilitate the traffic steering.

FIG. 11 illustrates an example method 1100 for determining whether traffic associated with a UE is to be steered from a source access point to a target access point, according to an aspect of the subject disclosure. As an example, method 1100 can be implemented by the source access point (and/or a UE coupled to the source access point device) to determine whether a handover (and/or additional connection) to a new network is to be performed. At 1102, rate of congestion data associated with the target access point can be received. As an example, a current load index for the target access point can also be received. Further, at 1106, it can be determined whether the rate of congestion data (and optionally the current load index) satisfies a predefined rate criterion (e.g., is greater than a rate threshold). If determined that the rate of congestion data does not satisfy the predefined rate criterion, then, at 1106, a handover can be facilitated to steer one or more data flows associated with the UE from the source access point to the target access point. It is noted that the UE is not limited to performing a handover (e.g., disconnecting from the source access point) and can be simultaneously (or substantially simultaneously) coupled to both the source access point and the target access point. In this example scenario, the UE can determine, based on operator policy and/or application preferences, which data (e.g., a first set of IP flows) is to be communicated via the source access point and which data (e.g., a second set of IP flows) is to be communicated via the target access point. Further, if determined, at 1104, that the rate of congestion data satisfies the predefined rate criterion, then, at 1108, the UE can continue to be coupled to and communicate via the source access point.

Figure 12:
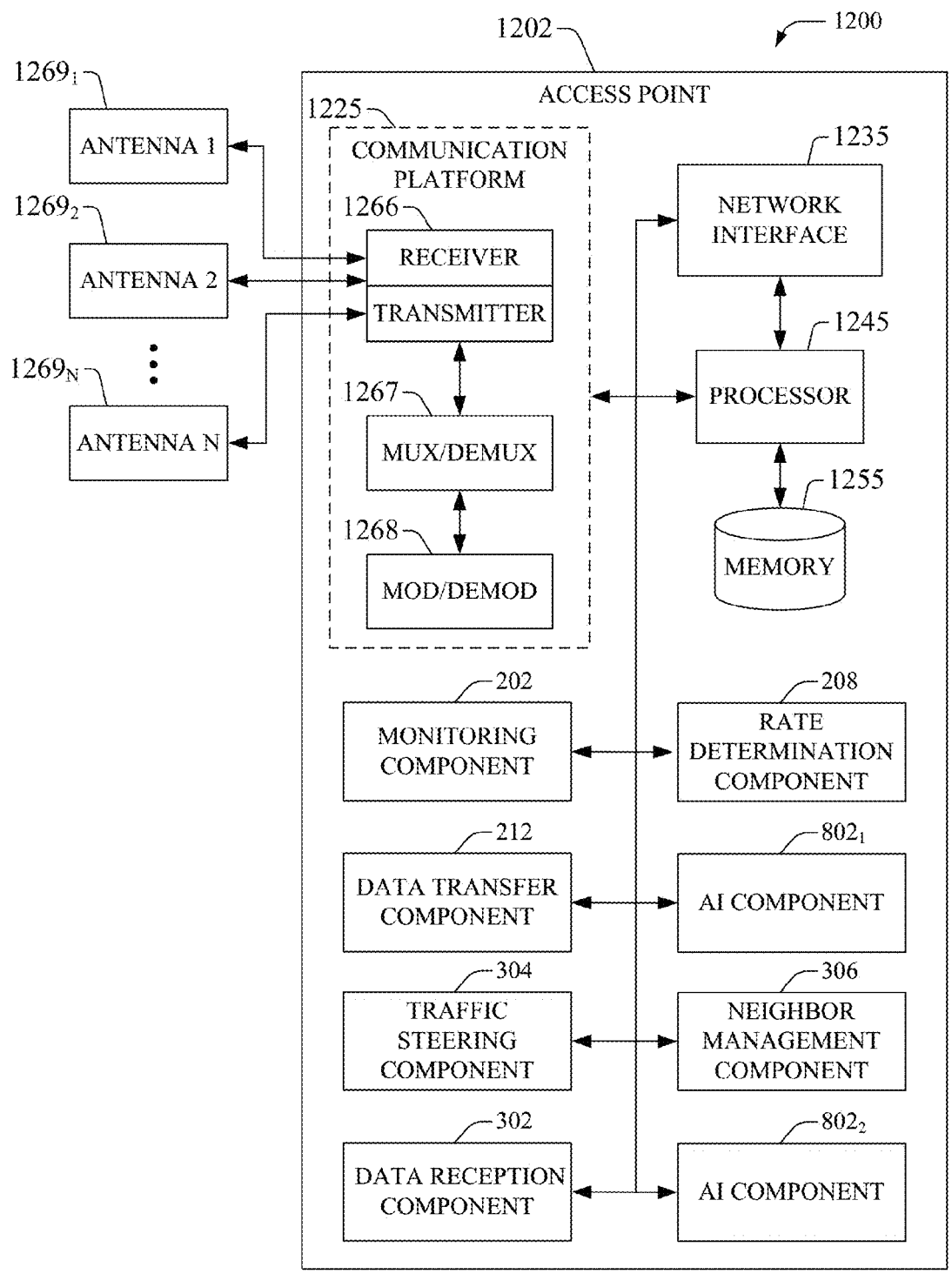
FIG. 12 illustrates an example block diagram of an access point suitable for traffic steering based on rate of congestion data.
Figure 13:
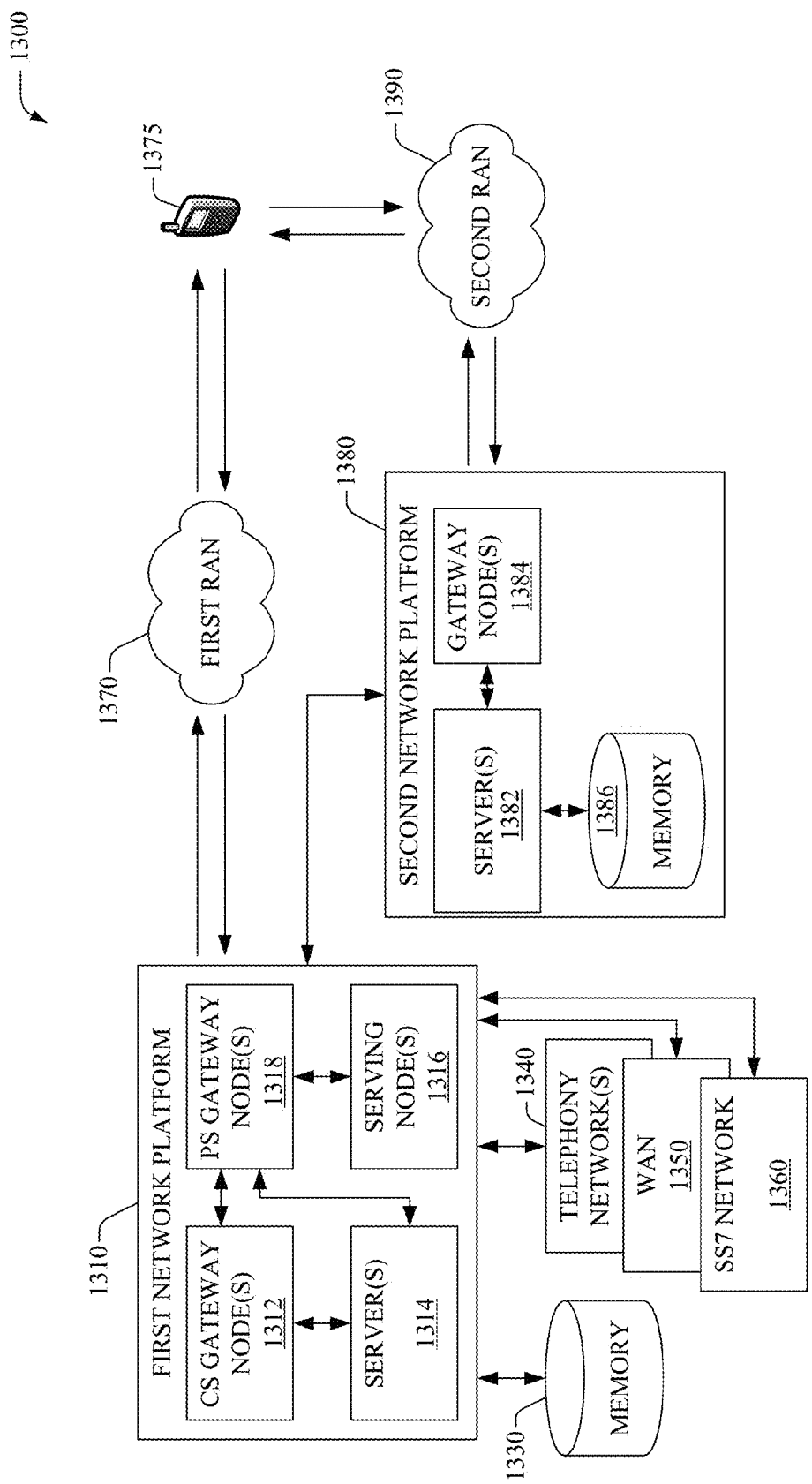
FIG. 13 illustrates an example wireless communication environment for network selection based on rate of congestion data.

To provide further context for various aspects of the subject specification, FIGS. 12 and 13 illustrate, respectively, a block diagram of an example embodiment 1200 of an access point that facilitates traffic steering based on rate of congestion data to facilitate traffic steering and a wireless communication environment 1300, with associated components for operation of efficient network selection in accordance with aspects described herein.

With respect to FIG. 12, in example embodiment 1200 comprises an access point 1202. As an example, the source access point 102 and/or the target access point 104 disclosed herein with respect to system 100-800 can each include at least a portion of the access point 1202. In one aspect, the access point 1202 can receive and transmit signal(s) (e.g., traffic and control signals) from and to wireless devices, access terminals, wireless ports and routers, etc., through a set of antennas $1269_1$-$1269_N$. It should be appreciated that while antennas $1269_1$-$1269_N$ are a part of communication platform 1225, which comprises electronic components and associated circuitry that provides for processing and manipulating of received signal(s) (e.g., a packet flow) and signal(s) (e.g., a broadcast control channel) to be transmitted. In an aspect, communication platform 1225 can include a transmitter/receiver (e.g., a transceiver) 1266 that can convert signal(s) from analog format to digital format (e.g., analog-to-digital conversion) upon reception, and from digital format to analog (e.g., digital-to-analog conversion) format upon transmission. In addition, receiver/transmitter 1266 can divide a single data stream into multiple, parallel data streams, or perform the reciprocal operation. Coupled to transceiver 1266 is a multiplexer/demultiplexer 1267 that facilitates manipulation of signal in time and/or frequency space. Electronic component 1267 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1267 can scramble and spread information (e.g., codes) according to substantially any code known in the art; e.g., Hadamard-Walsh codes, Baker codes, Kasami codes, polyphase codes, and so on. A modulator/demodulator 1268 is also a part of operational group 1225, and can modulate information according to multiple modulation techniques, such as frequency modulation, amplitude modulation (e.g., M-ary quadrature amplitude modulation (QAM), with M a positive integer), phase-shift keying (PSK), and the like.

Access point 1202 also includes a processor 1245 configured to confer functionality, at least partially, to substantially any electronic component in the access point 1202, in accordance with aspects of the subject disclosure. In particular, processor 1245 can facilitates implementing configuration instructions received through communication platform 1225, which can include storing data in memory 1255. In addition, processor 1245 facilitates processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1245 can manipulate antennas $1269_1$-$1269_N$ to facilitate beamforming or selective radiation pattern formation, which can benefit specific locations covered by the access point 1202; and exploit substantially any other advantages associated with smart-antenna technology. Memory 1255 can store data structures, code instructions, system or device information like device identification codes (e.g., International Mobile Station Equipment Identity (IMEI), Mobile Station International Subscriber Directory Number (MSISDN), serial number . . . ) and specification such as multimode capabilities; code sequences for scrambling; spreading and pilot transmission, floor plan configuration, access point deployment and frequency plans; and so on. Moreover, memory 1255 can store configuration information such as schedules and policies; geographical indicator(s); network load data, rate of congestion data (e.g., of access point 1202 and/or neighboring access points), historical logs, and so forth. In one example, data store 206 can be implemented in memory 1255.

In embodiment 1200, processor 1245 can be coupled to the memory 1255 in order to store and retrieve information necessary to operate and/or confer functionality to communication platform 1225, network interface 1235 (e.g., that coupled the access point to core network devices such as but not limited to a network controller), and other operational components (e.g., multimode chipset(s), power supply sources . . . ; not shown) that support the access point 1202. The access point 1202 can further include a monitoring component 202, a rate determination component 208, a data transfer component 212, an AI component $802_1$, a data reception component 302, a traffic steering component 304, a neighbor management component 306, and/or an AI component $802_2$ which can include functionality, as more fully described herein, for example, with regard to systems 100-400 and 800. In addition, it is to be noted that the various aspects disclosed in the subject specification can also be implemented through (i) program modules stored in a computer-readable storage medium or memory (e.g., memory 1255) and executed by a processor (e.g., processor 1245), or (ii) other combination(s) of hardware and software, or hardware and firmware.

Referring now to FIG. 13, there illustrated is a wireless communication environment 1300 that includes two wireless network platforms: (i) A first network platform 1310 (e.g., macro network platform) that serves, or facilitates communication with user equipment 1375 via a first RAN 1370. As an example, in cellular wireless technologies (e.g., 3GPP UMTS, HSPA, 3GPP LTE, 3GPP UMB, 4G LTE, etc.), the first network platform 1310 can be embodied in a Core Network; and (ii) A second network platform 1380 (e.g., macro network platform, femto network platform, wireless local area network (WLAN) platform, etc.), which can provide communication with UE 1375 through a second RAN 1390 linked to the second network platform 1380. It should be appreciated that the second network platform 1380 can offload UE 1375 from the first network platform 1310, once UE 1375 attaches (e.g., based on the traffic steering described herein) to the second RAN. In one example, the first RAN and the second RAN can be commonly operated and/or deployed by a common service provider. Further, it can be noted that in one example (not shown) the second RAN 1390 can be directly coupled to the first network platform 1310.

It is noted that RAN (1370 and/or 1390) includes base station(s), or access point(s), and its associated electronic circuitry and deployment site(s), in addition to a wireless radio link operated in accordance with the base station(s). Accordingly, the first RAN 1370 can comprise various access points like source access point 102, while the second RAN 1390 can comprise multiple access points like target access point 104.

Both the first and the second network platforms 1310 and 1380 can include components, e.g., nodes, gateways, interfaces, servers, or platforms, that facilitate packet-switched (PS) and/or circuit-switched (CS) traffic (e.g., voice and data) and control generation for networked wireless communication. For example, the first network platform 1310 includes CS gateway node(s) 1312 which can interface CS traffic received from legacy networks like telephony network(s) 1340 (e.g., public switched telephone network (PSTN), or public land mobile network (PLMN)) or a SS7 network 1360. Moreover, CS gateway node(s) 1312 interfaces CS-based traffic and signaling and gateway node(s) 1318. In addition to receiving and processing CS-switched traffic and signaling, gateway node(s) 1318 can authorize and authenticate PS-based data sessions with served (e.g., through the first RAN 1370) wireless devices. Data sessions can include traffic exchange with networks external to the first network platform 1310, like wide area network(s) (WANs) 1350; it should be appreciated that local area network(s) (LANs) can also be interfaced with first network platform 1310 through gateway node(s) 1318. Gateway node(s) 1318 generates packet data contexts when a data session is established. It should be further appreciated that the packetized communication can include multiple flows that can be generated through server(s) 1314. The first network platform 1310 also includes serving node(s) 1316 that conveys the various packetized flows of information or data streams, received through gateway node(s) 1318. It is to be noted that server(s) 1314 can include one or more processors configured to confer at least in part the functionality of first network platform 1310. To that end, one or more processors can execute code instructions stored in memory 1330 or other computer-readable medium, for example.

In example wireless environment 1300, memory 1330 can store information related to operation of first network platform 1310. Information can include business data associated with subscribers; market plans and strategies, e.g., promotional campaigns, business partnerships; operational data for mobile devices served through first network platform; service and privacy policies; end-user service logs for law enforcement; and so forth. Memory 1330 can also store information from at least one of telephony network(s) 1340, WAN(s) 1350, or SS7 network 1360. Many different types of information can be stored in memory 1330 without departing from example embodiments.

Gateway node(s) 1384 can have substantially the same functionality as PS gateway node(s) 1318. Additionally, or optionally, the gateway node(s) 1384 can also include substantially all functionality of serving node(s) 1316. In an aspect, the gateway node(s) 1384 can facilitate handover resolution, e.g., assessment and execution. Server(s) 1382 have substantially the same functionality as described in connection with server(s) 1314 and can include one or more processors configured to confer at least in part the functionality of the first network platform 1310. In one example, the network load management system 402 can be implemented or executed by server(s) 1382 and/or server(s) 1314. To that end, the one or more processor can execute code instructions stored in memory 1386, for example.

Memory 1386 can include information relevant to operation of the various components of the second network platform 1380. For example, operational information that can be stored in memory 1386 can comprise, but is not limited to, subscriber information; contracted services; maintenance and service records; cell configuration (e.g., devices served through second RAN 1390; access control lists, or white lists); service policies and specifications; privacy policies; add-on features; and so forth.

Figure 14:
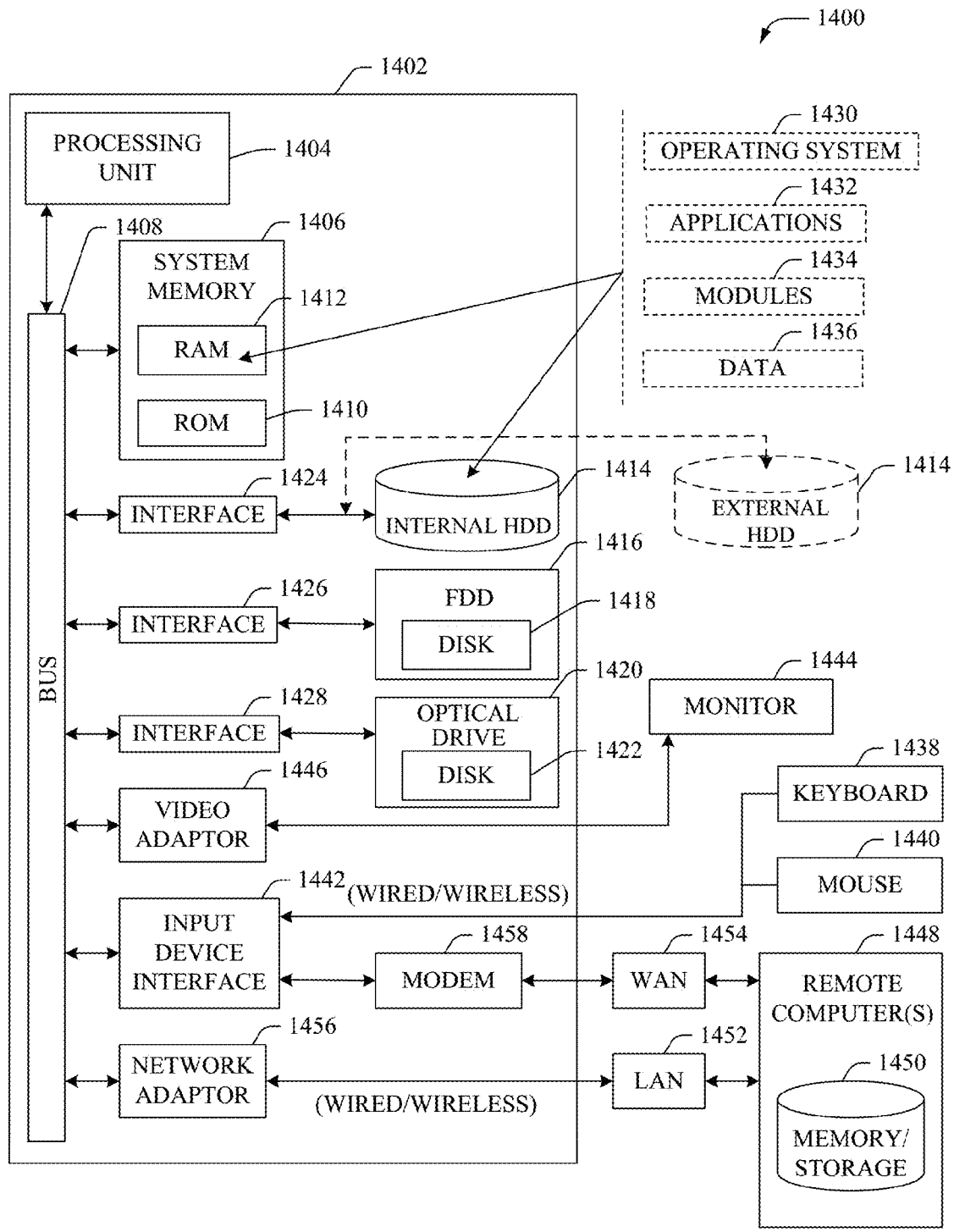
FIG. 14 illustrates a block diagram of a computer operable to execute the disclosed communication architecture.

Referring now to FIG. 14, there is illustrated a block diagram of a computer 1402 operable to execute the disclosed communication architecture. In order to provide additional context for various aspects of the disclosed subject matter, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various aspects of the specification includes a computer 1402, the computer 1402 including a processing unit 1404, a system memory 1406 and a system bus 1408. As an example, the component(s), server(s), equipment, system(s), and/or device(s) (e.g., source access point 102, target access point 104, UE 108, monitoring component 202, rate determination component 208, data transfer component 212, data reception component 302, traffic steering component 304, neighbor management component 306, network load management system 402, MME 602, SGSN 604, RNC 606, AI components $802_1$-$802_2$, access point 1202, first network platform 1310, second network platform 1380, etc.) disclosed herein with respect to system 100-800 and 1200-1300 can each include at least a portion of the computer 1402. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414, which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and/or a pointing device, such as a mouse 1440 or a touchscreen or touchpad (not illustrated, but which may be integrated into UE 108 in some embodiments). These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc. A monitor 1444 or other type of display device is also connected to the system bus 1408 via an interface, such as a video adapter 1446.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., desktop and/or portable computer, server, communications satellite, etc. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic 10BaseT wired Ethernet networks used in many offices.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving rate of congestion data for data traffic communicated between a first network device and a second network device of a communication network during a defined time interval, wherein the rate of congestion data comprises a first classification value indicative of a first increase in the data traffic during the defined time interval, or a second classification value indicative of a second increase in the data traffic during the defined time interval, and wherein the second increase is different from the first increase; and
in response to determining that a third increase in the data traffic during the defined time interval corresponds to the first classification value, steering a data flow from a user equipment associated with the communication network to the first network device.

2. The system of claim 1, wherein the operations further comprise:
in response to determining that the third increase in the data traffic during the defined time interval corresponds to the second classification value, preventing the data flow from being steered to the first network device.

3. The system of claim 1, wherein the receiving comprises receiving the rate of congestion data from a third network device via a radio access message.

4. The system of claim 1, wherein the operations further comprise:
repeatedly storing data in a data store to facilitate determination of the rate of congestion data during the defined time interval.

5. The system of claim 1, wherein the rate of congestion data comprises a third classification value indicative of a fourth increase in the data traffic during the defined time interval, and wherein the operations further comprise:
in response to determining that the third increase in the data traffic during the defined time interval corresponds to the third classification value, steering the data flow associated with the user equipment to the second network device.

6. The system of claim 1, wherein the operations further comprise:
transmitting, to the user equipment based on the rate of congestion data, instruction data that instructs the user equipment to establish a connection with the first network device.

7. The system of claim 1, wherein the receiving comprises receiving the rate of congestion data via a radio access network information message.

8. The system of claim 1, wherein the receiving comprises receiving the rate of congestion data in response to determining that a speed of change in congestion for the data traffic has satisfied a defined criterion.

9. The system of claim 1, wherein the steering further comprises steering the data flow to the first network device based on load data that represents a network load of the first network device.

10. A method, comprising:
determining, by a system comprising a processor, rate of congestion data for a network load associated with a first network device and a second network device of a network during a specified period of time, wherein the rate of congestion data comprises a first classification value indicative of a first fractional increase in the network load during the specified period of time, or a second classification value indicative of a second fractional increase in the network load during the specified period of time; and
transmitting, by the system, a data flow from a user equipment associated with the network to the first network device in response to determining that a third fractional increase in the network load during the specified period of time corresponds to the first classification value more closely than to the second classification value.

11. The method of claim 10, wherein the transmitting comprises transmitting the data flow to the first network device after the specified period of time.

12. The method of claim 10, wherein the determining comprises determining a normalized value that represents the first classification value or the second classification value.

13. The method of claim 10, wherein the determining comprises determining the rate of congestion data based on a radio access message associated with a third network device.

14. The method of claim 10, further comprising:
preventing, by the system, the data flow from being transmitted to the first network device in response to determining that the third fractional increase in the network load during the specified period of time corresponds to the second classification value.

15. The method of claim 10, further comprising:
repeatedly storing, by the system, data in a data store during a specified period of time to facilitate determination of the rate of congestion data.

16. A non-transitory machine-readable storage medium comprising executable instructions that, when executed by a processor, facilitate performance of operations, comprising:
receiving rate of congestion data for data traffic communicated between an access point device and a network device of a wireless communication network during a defined time period, wherein the rate of congestion data comprises a first classification indicative of a first amount increase in the data traffic during the defined time period, or a second classification indicative of a second amount increase in the data traffic during the defined time period; and
directing a data flow associated with the wireless communication network to the access point device in response to a determination that a third amount increase in the data traffic during the defined time period corresponds to the first classification.

17. The non-transitory machine-readable storage medium of claim 16, wherein the access point device is a first access point device, and wherein the operations further comprise:
directing the data flow to a second access point device in response to a determination that the third amount increase in the data traffic during the defined time period corresponds to the second classification.

18. The non-transitory machine-readable storage medium of claim 16, wherein the operations further comprise:
receiving the rate of congestion data in response to determining that a rate of change in congestion for the data traffic has satisfied a defined criterion.

19. The non-transitory machine-readable storage medium of claim 16, wherein the receiving comprises receiving the rate of congestion data after the defined time period.

20. The non-transitory machine-readable storage medium of claim 16, wherein the receiving comprises receiving the rate of congestion data via a radio access network information message.

* * * * *